United States Patent [19]
Johnson et al.

[11] Patent Number: 5,889,602
[45] Date of Patent: Mar. 30, 1999

[54] OPTICAL HINGE

[75] Inventors: Earnest J. Johnson, Mesa; Christopher K. Y. Chun, Gilbert; Barbara McNeill Foley, Phoenix, all of Ariz.; Cary D. Perttunen, Shelby Township, Mich.; Daniel B. Schwartz, Apache Junction; George Edward Charles, Chandler, both of Ariz.

[73] Assignee: Motorola, Inc., Schaumburg, Ill.

[21] Appl. No.: 763,192

[22] Filed: Dec. 10, 1996

[51] Int. Cl.⁶ .................................................. H04B 10/00
[52] U.S. Cl. ............................ 359/154; 359/159; 359/193
[58] Field of Search .................... 359/154, 159, 359/193

[56] References Cited

U.S. PATENT DOCUMENTS

| | | | |
|---|---|---|---|
| 4,162,196 | 7/1979 | Folsom et al. | 435/304.1 |
| 4,353,062 | 10/1982 | Lorteije et al. | 345/147 |
| 4,353,069 | 10/1982 | Handel et al. | 342/1 |
| 5,233,673 | 8/1993 | Vali et al. | 385/3 |
| 5,248,879 | 9/1993 | Turvy, Jr. | 250/205 |
| 5,306,869 | 4/1994 | Springer et al. | 174/36 |
| 5,310,361 | 5/1994 | Muchowicz et al. | 439/610 |
| 5,321,310 | 6/1994 | Mizuki | 307/104 |
| 5,406,412 | 4/1995 | Zehnpfennig et al. | 359/399 |

FOREIGN PATENT DOCUMENTS

| | | | |
|---|---|---|---|
| 0338789 | 10/1989 | European Pat. Off. | 359/159 |
| 0484912 | 5/1992 | European Pat. Off. | 359/159 |
| 3625042 | 2/1987 | Germany | 359/159 |
| 32846 | 2/1993 | Japan . | |

*Primary Examiner*—Thomas J. Mullen, Jr.
*Attorney, Agent, or Firm*—Eugene A. Parsons; William E. Koch

[57] ABSTRACT

An optical hinge (20) provides one or more free space optical communication links through the hinge (17) of an instrument (10). The optical links include a transmitter (24) in one section (14) of the instrument (10) and a receiver (34) in the other section (16) of the instrument (10). An optical coupler (27) connects the transmitter (24) to the receiver (34) through a hinge (17).

23 Claims, 6 Drawing Sheets

OPTICAL HINGE

FIELD OF THE INVENTION

The present invention relates generally to the field of inter-connection systems and more particularly to an optical hinge.

BACKGROUND OF THE INVENTION

Portable computers 10 (See FIG. 1) use a ribbon cable 12 to connect a processor in a keyboard section 14 to a display 16, through a hinge 17. The hinge 17 allows the display section 16 to be tilted to a variety of positions for improved viewing. Graphics intensive applications have resulted in the ribbon cable 12 carrying faster data rates at higher clock speeds. The transmission lines of a ribbon cable emit Electro-Magnetic Interference (EMI). At higher data rates the transmission lines act like antennas and typically emit higher EMI levels. A number of modifications can be made to the prior art ribbon cables to decrease the amount of EMI they emit. However, most of these modifications require increased shielding adding to the weight of the computer.

Thus there exists a need for a system that can provide a high data rate communication path with lower EMI, low weight and that operates through a hinge of an instrument, such as a portable computer.

DETAILED DESCRIPTION OF THE DRAWINGS

In summary the invention provides one or more free space optical communication links through the hinge of an instrument. The optical links include a transmitter in one section of the instrument and a receiver in the other section of the instrument. An optical coupler connects the transmitter to the receiver through a hinge. The optical coupler includes either a transmitter lens, a receiver lens or both. The lens, receiver and transmitter are aligned in such a way that an optical link can be maintained over a range of angles. By using an optical link the EMI emitting ribbon cable is replaced with a system that does not emit any significant EMI.

Figure 1:
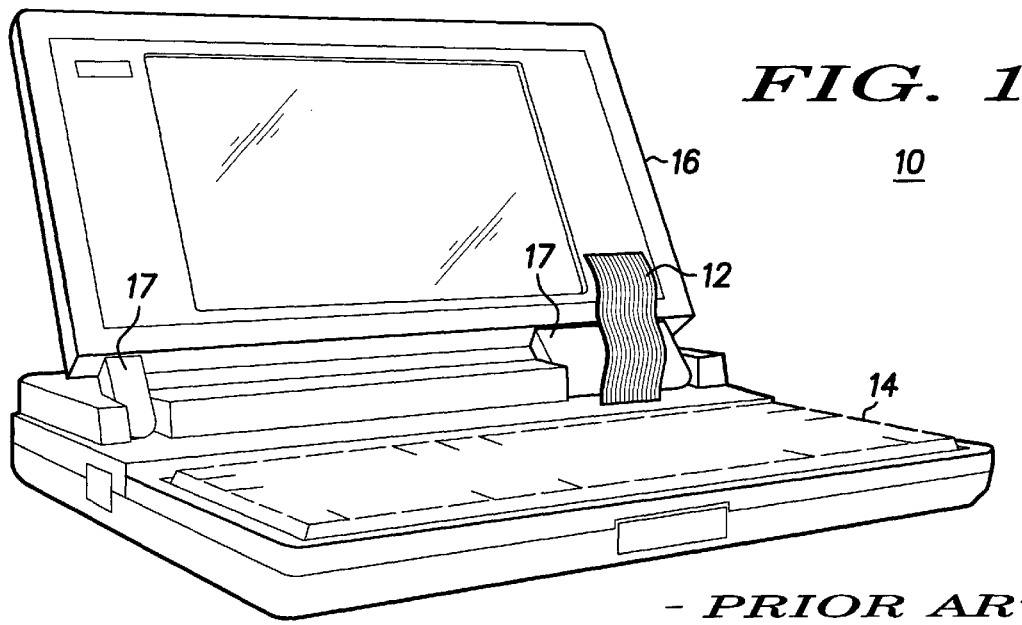
FIG. 1 is a perspective view of a prior art portable computer.
Figure 2:
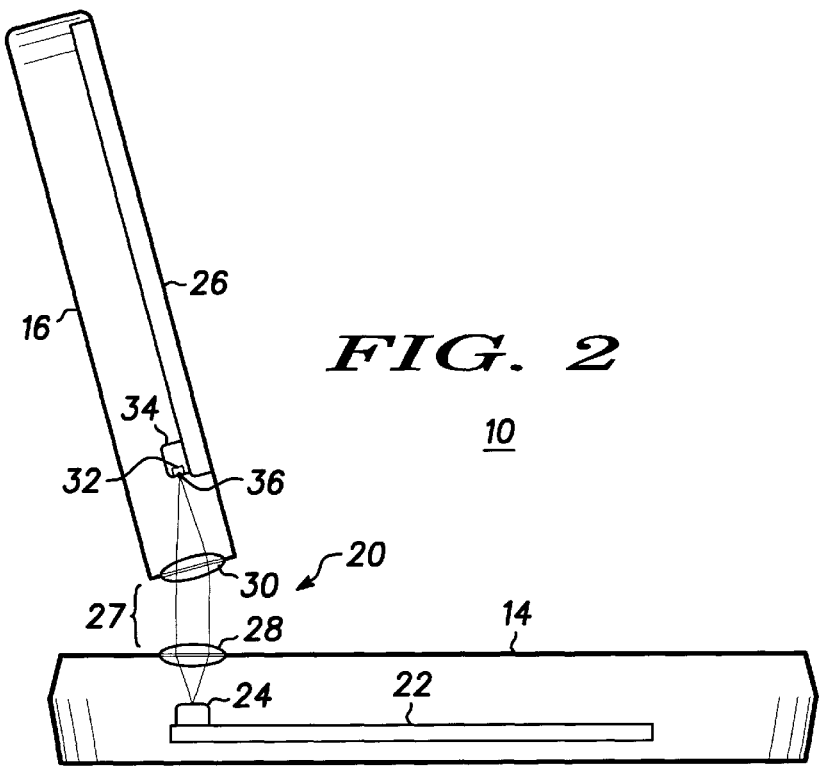
FIG. 2 is a cross sectional view of an optical hinge according to one embodiment of the invention.

FIG. 2 is a cross section of an embodiment of the optical hinge according to an embodiment of the invention. The optical hinge 20 is shown in a portable computer 10, but can be used for communicating through any hinge of an electronic instrument. In the portable computer 10, high speed data is sent by the keyboard section (transmitter housing) 14 and received by the display section (receiver housing) 16. The keyboard section 14 contains the computer keyboard, interface circuitry, memory and a processor (microprocessor). The processor generates signals that drive a display 26 of the portable computer. The complex, high speed graphics used by today's programs require large amounts of data that is sent from the transmitter housing 14 to the receiver housing 16.

The transmitter housing 14 contains a transmitter 22 having a transmitting light source 24. The transmitting light source 24 can be a laser diode or a Light Emitting Diode (LED). The transmitting light source 24 emits an optical signal that is modulated by a data signal (e.g. graphics signal). In the case of a portable computer the data signals are the graphic signals that drive the display 26. The optical signal is directed from the transmitter source 24 to a receiver 34 by an optical coupler (free space optical hinge) 27 having a transmitter lens 28 and a receiver lens 30 in this embodiment. The transmitter lens 28 collimates the optical signal and the collimated light is focused by a receiver lens 30 onto a detector 32. The detector 32 is part of the receiver 34 that includes a demodulator to demodulate the optical signal. The detector 32 is substantially aligned with the pivot point (pivot line) 36 of the mechanical hinge. 17. In addition, the focal point of the receiver lens 30 is at the detector 32 or proximate the pivot point 36. As a result, the receiver housing 16 can pivot several degrees either side of vertical and still receive the optical signal.

In one embodiment, the data signals from the processor in the transmitter housing 14 are first multiplexed and then used to modulate signals from the transmitter source 22. The receiver 34 detects then demultiplexes the transmitted data signals. In another embodiment, a plurality of optical signals are transmitted through the hinge 17. Each of the optical signals is modulated by one of the data signals sent from the processor.

Figure 3:
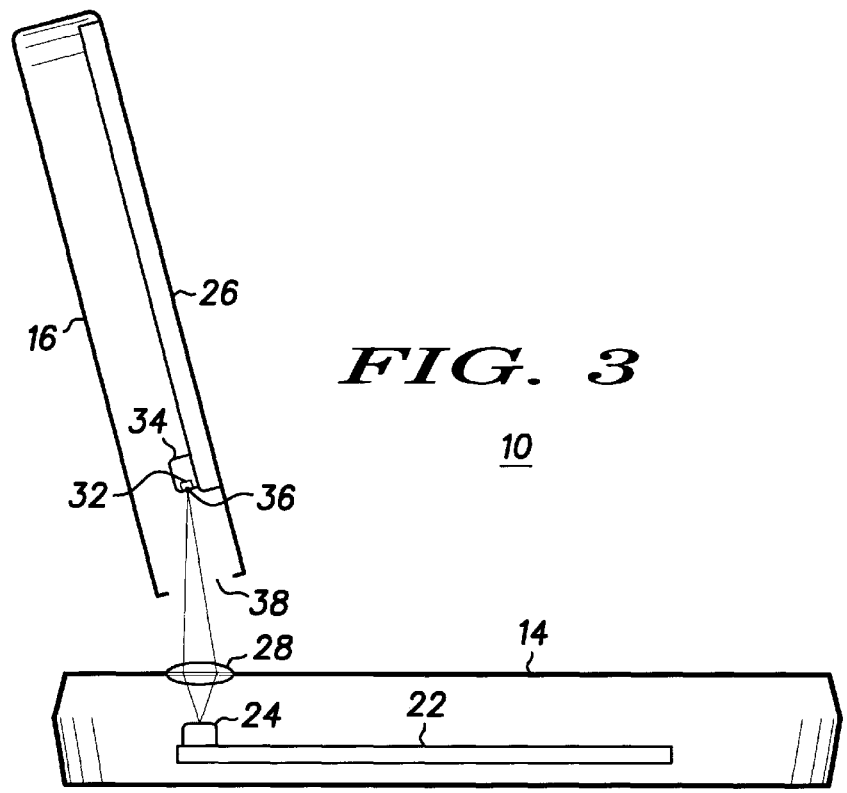
FIG. 3 is a cross sectional view of another optical hinge according to another embodiment of the invention.

FIG. 3 shows another embodiment of the optical hinge. In this case a single lens 28 is used to focus the optical signal from the transmitting light source 24. Again the detector 32 is located at or near the pivot point 36 of the mechanical hinge 17. The receiver housing 16 has an open aperture 38 instead of a lens, such as the lens 30. As a result, the optical link can be maintained over the angle allowed by the aperture 38.

Figure 4:
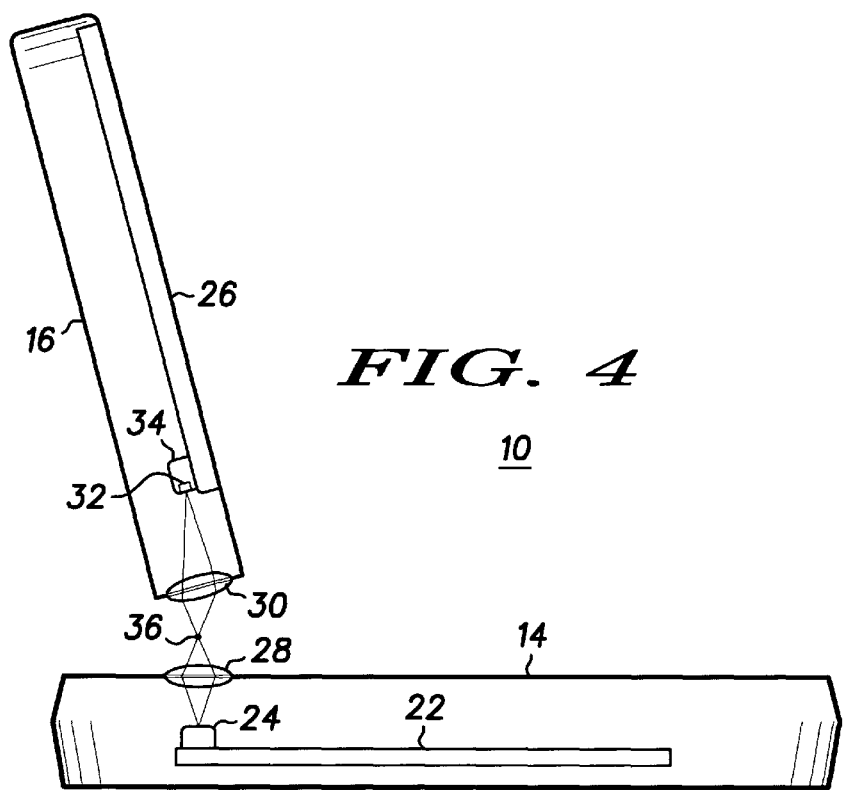
FIG. 4 is a cross sectional view of another optical hinge according to another embodiment of the invention.

FIG. 4 is another embodiment of the optical hinge. In this embodiment two lenses 28, 30 are used, however the transmitter lens 28 focuses the optical signal to a point rather than collimating the light. The receiver lens 30 then refocuses the light on the detector 32. The pivot point 36 in this case is at the transmitter focal point of the transmitter lens 28. In another variation of this embodiment the pivot point 36 may be located at the detector 32.

In the embodiments shown in FIGS. 2–4 the lenses are shown as convex lenses, however any of these convex lenses could be replaced by any of the following: a holographic optical element, a binary lens or a Fresnel Zone plate.

Figure 5:
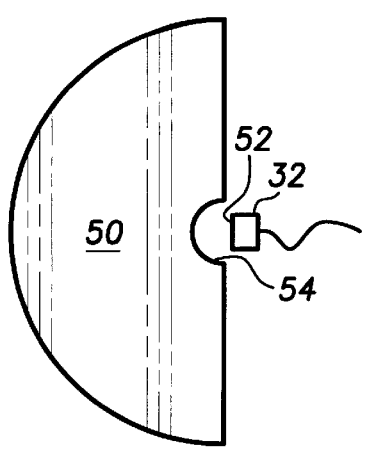
FIG. 5 is an end view of a rod lens and a detector.
Figure 6:
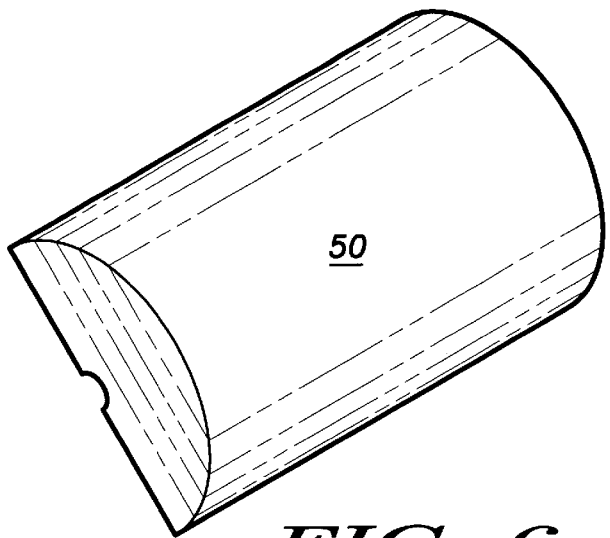
FIG. 6 is a side view of the rod lens of FIG. 5.

FIG. 5 is an end view of a rod lens 50 having a focal point (line) 52 at the surface of the detector 32. A side view of the rod lens 50 is shown in FIG. 6. The rod lens 50 is one half of a circular rod with a notch cutout 54. A rod lens 50 may focus light received on its circular portion at the center of the circle defined by the edge of the rod lens 50. The rod lens 50 is ideally designed to allow a transmitter section such as transmitter 24 to transmit a plurality of optical signals that can be received by a plurality of detectors spaced along the length of the center of the rod lens 50.

Figure 7:
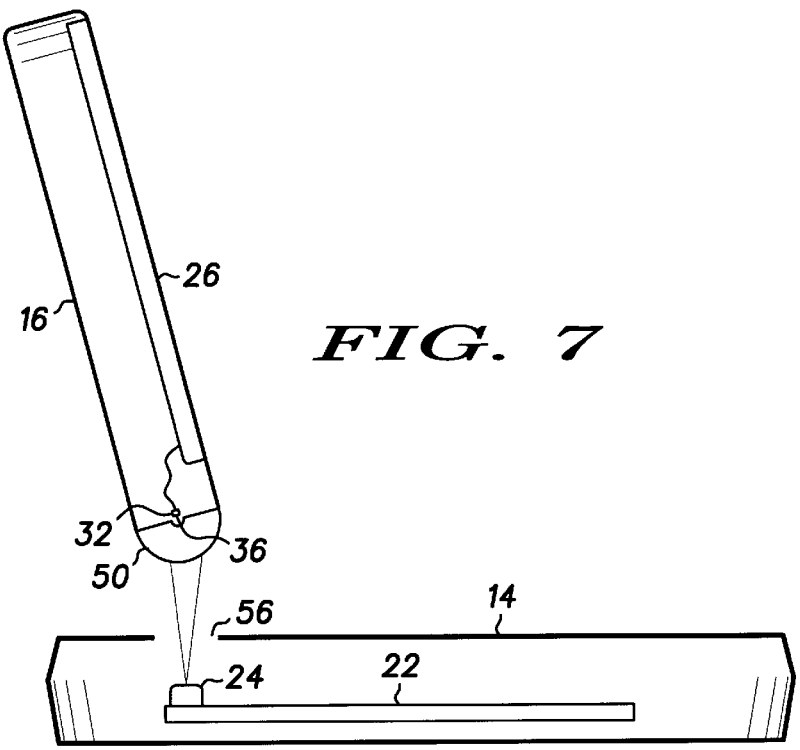
FIG. 7 is a cross sectional view of another optical hinge according to another embodiment of the invention.

FIG. 7 shows the rod lens 50 used in the portable computer 10 to form another embodiment of an optical hinge. The transmitter 24 emits an optical signal toward the rod lens 50, to focus the optical signal onto the detector 32. The detector 32 or focal line is on or proximate the pivot line 36 of the mechanical hinge 17. As a result the receiver housing 16 can pivot almost ninety degrees on either side of vertical without losing the optical signal. In another embodiment the rod lens 50 could be seated in an aperture 56 in the transmitter housing 14.

Figure 8:
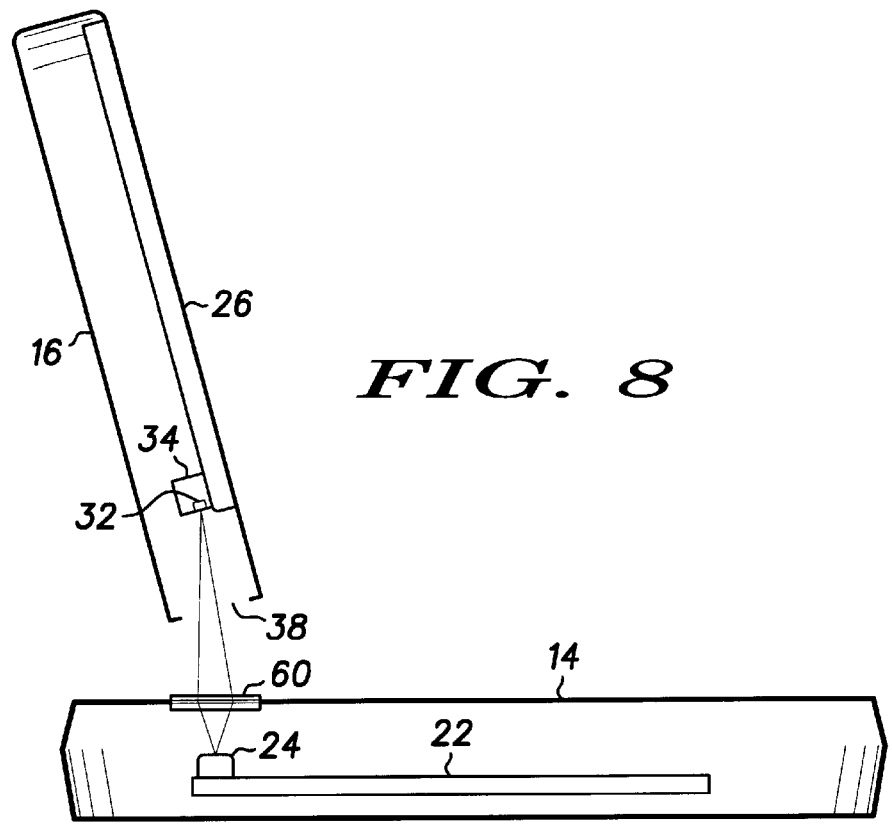
FIG. 8 is a cross sectional view of another optical hinge according to another embodiment of the invention.

FIG. 8 shows another embodiment of the optical hinge wherein components similar to those described with reference to FIG. 3 are designated with similar numbers and operate in a similar fashion. In this case an adaptive optics lens 60 is the only optical element used in the optical hinge. The adaptive optics lens 60 works similarly to a phased array antenna. Steering and focusing of an optical beam is achieved by phase variations induced across the surface of the adaptive optics lens 60. In one embodiment, this phase variation is accomplished by an electro-optic phase changing network. An example of a suitable electro-optic phase changing network is described in U.S. Pat. No. 5,233,673. The electro-optic phase changing network consists of a plurality of optical waveguides. Each of the plurality of optical waveguides carries a portion of the optical signal. Electrical voltages are applied across individual optical waveguides to vary the phase at the output by changing the index of refraction of the optical waveguides. The necessary phase change at each output to steer the output optical signal may be determined by one skilled in the art.

Figure 9:
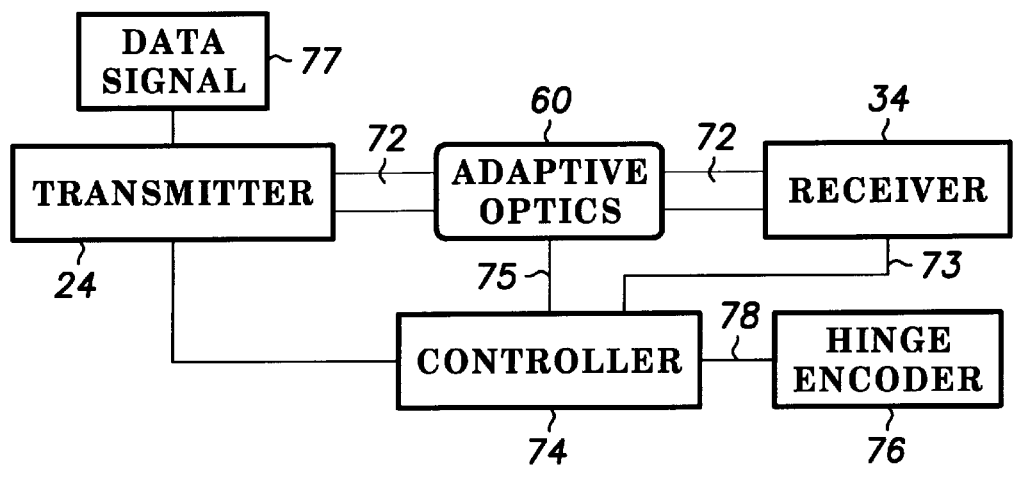
FIG. 9 is a block diagram of an adaptive optics system.

Using the adaptive optics lens 60 an optical signal from the transmitter 24 can be steered over a wide range of angles. The adaptive optics system 70 (shown in FIG. 9) scans possible locations of the detector 32 to acquire a link (i.e, to point the optical signal at the detector). A feed-back circuit provides a feedback signal to notify the adaptive optics lens 60 when the receiver 34 has been illuminated by the optical signal. The feed-back function may be performed by the controller 74 in response to a signal 73 from the receiver 34 when it has been illuminated. A control signal 75 is then sent to the adaptive optics lens 60 to lock the optical signal in place.

The adaptive optics system 70 includes the transmitter 24 that emits the optical signal 72 that is modulated by the data signal 77. The optical signal 72 is directed (steered) by the adaptive optics lens 60. A controller 74 is coupled to and controls the adaptive optics lens 60, by adjusting the individual phase changes at each output. A hinge encoder (encoder) 76 attached to the mechanical hinge 17 sends a position signal 78 to the controller 74. Using the position signal the controller 74 executes an acquisition routine to acquire a link with the receiver 34. When the receiver 34 detects the optical signal 72 a detection signal 73 is sent to the controller 74. The controller 74 locks the adaptive optics lens 60 in place until the link is lost. The controller 74 can also control the transmitter 24 during the acquisition routine. In one embodiment the controller 74 causes the transmitter 24 to shine continuously while the acquisition routine is executed. In another embodiment the adaptive optics lens 60 is replaced by a two-dimensional diode array capable of independent phasing of each of the diodes.

Figure 10:
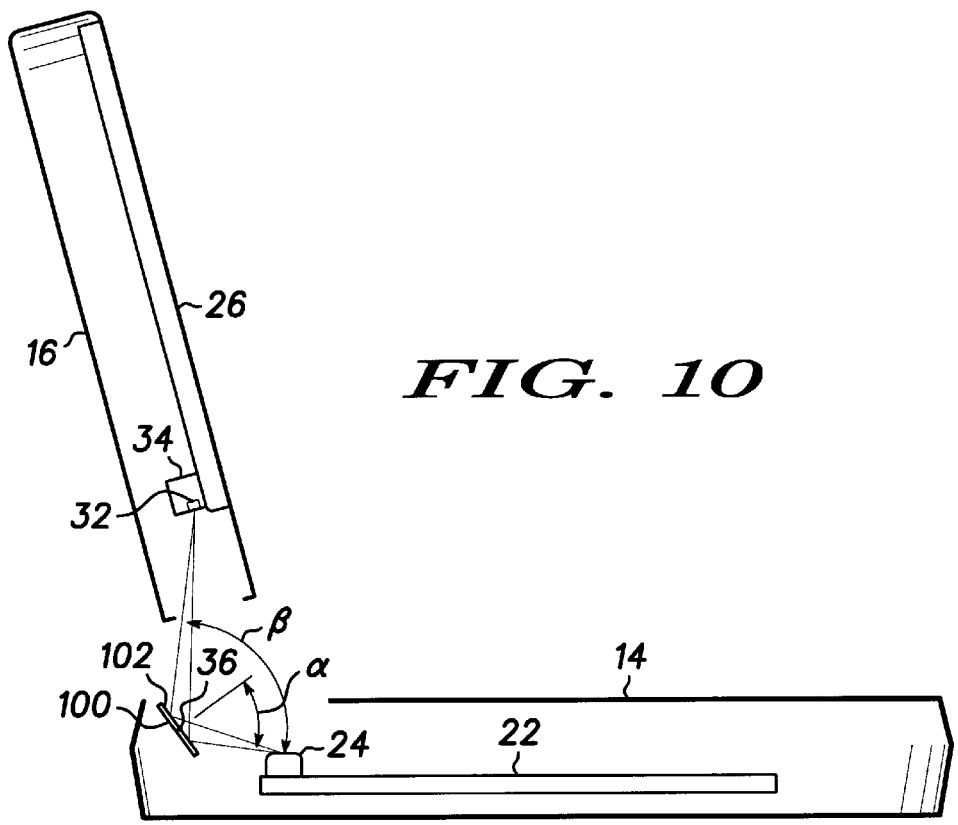
FIG. 10 is a cross sectional view of another optical hinge according to another embodiment of the invention.
Figure 11:
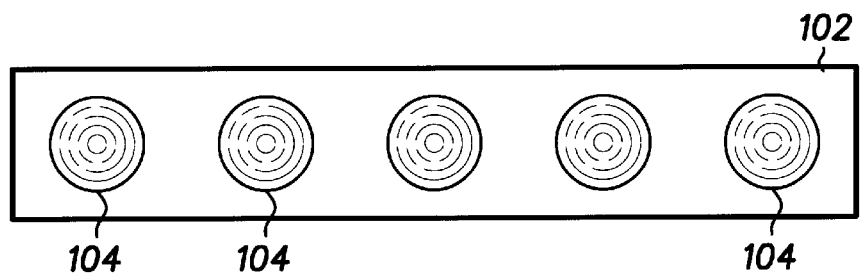
FIG. 11 is a side view of a reflective surface having a plurality of reflective elements.

FIG. 10 is another embodiment of the optical hinge. The transmitter 24 emits the optical signal toward a reflector (reflective element) 100 having a reflection surface 102. The refection surface 102 is preferably tangential to the pivot line 36. The reflective surface 102 has a reflective angle α that is approximately one half the transmitter—receiver angle β. As a result the reflective element 100 rotates at about one half the rate of the pivot 17.

The reflection surface 102 has a plurality of focusing elements (Fresnel mirror) 104. The focusing elements 104 focus the optical signal onto detector 32.

Figure 12:
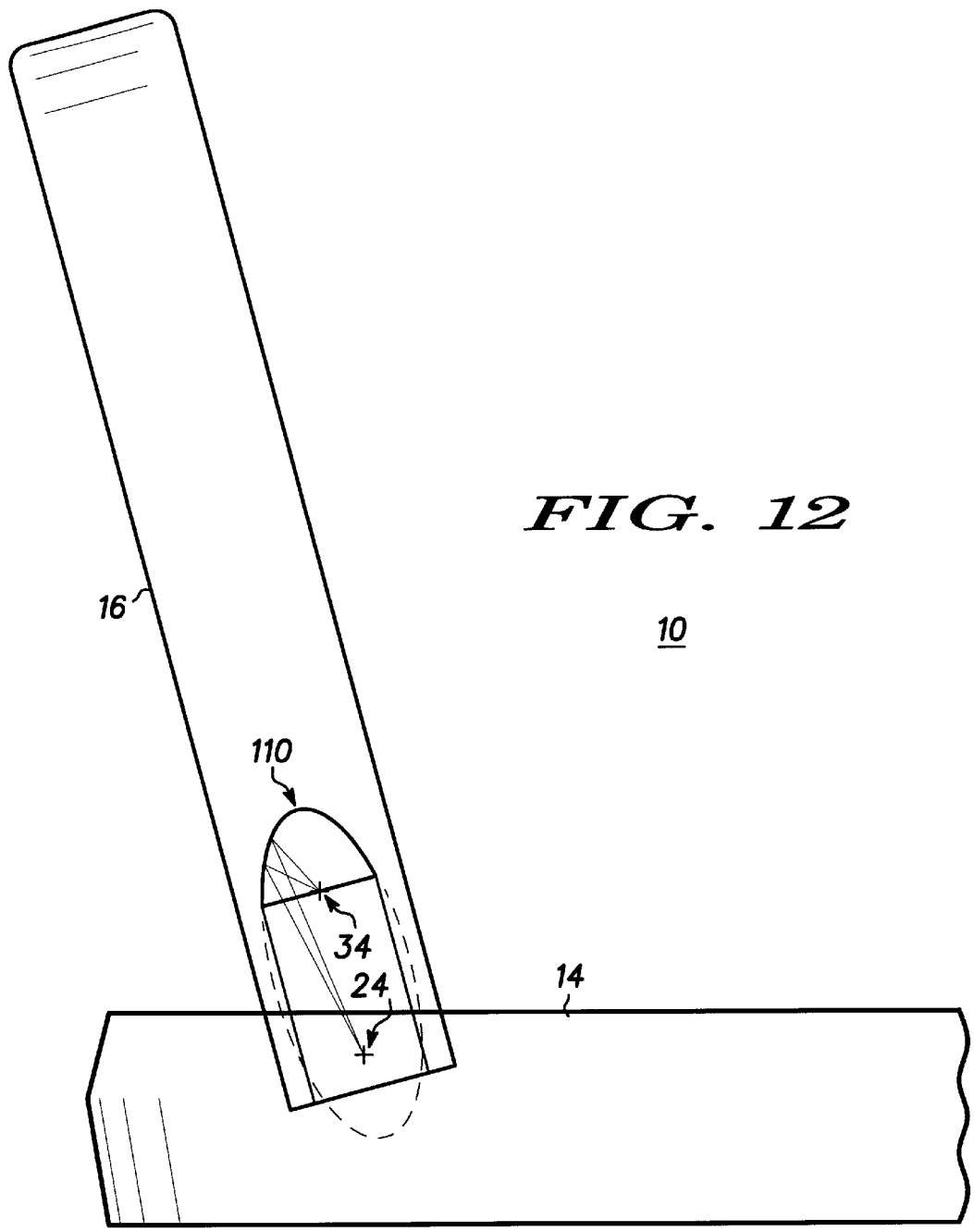
FIG. 12 is a cross section view of an optical hinge according to another embodiment of the invention.

FIG. 12 illustrates another embodiment of an optical hinge in accordance with the present invention. In this embodiment, the lens pair 28, 30 is replaced by an elliptical mirror 110, with the receiver mounted on a flat entrance surface of the mirror at one focus of the elliptical surface. The laser source 24 is placed at a second focus of the elliptical mirror 110. An axis of the hinge runs through the second focus of the ellipse.

Thus there has been described various embodiments of an optical hinge that can provide a high data rate communication path with low EMI, light weight and that can operate through a mechanical hinge of an electronic instrument. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An optical communication hinge comprising:
   a transmitter housing containing,
      (i) a transmitting light source emitting an optical signal modulated by a data signal, and
      (ii) a transmitter lens focusing the optical signal;
   a hinge having a pivot line, the hinge connected to the transmitter housing; and
   a receiver housing connected to the hinge, the receiver housing containing,
      (i) a receiver lens having a focal point substantially aligned with the pivot line, and
      (ii) a detector.

2. The optical communication hinge of claim 1, wherein the transmitting light source is a laser diode.

3. The optical communication hinge of claim 1, wherein the transmitter lens is a convex lens.

4. The optical communication hinge of claim 1, wherein the receiver lens is a convex lens.

5. The optical communication hinge of claim 1, wherein the receiver lens is a rod lens.

6. The optical communication hinge of claim 1, further including a demodulator coupled to the detector.

7. The optical communication hinge of claim 1, wherein the transmitter lens has a transmitter focal point on the pivot line.

8. The optical communication hinge of claim 1, wherein the detector is located proximate to the pivot line.

9. An optical communication hinge comprising:
   a transmitter housing;
   a transmitter emitting an optical signal, the transmitter contained in the transmitter housing;
   a free space optical hinge directing the optical signal;
   a mechanical hinge connected to the transmitter housing;
   a receiver housing connected to the mechanical hinge; and
   a receiver, contained in the receiver housing, receiving the optical signal from the free space optical hinge.

10. The optical communication hinge of claim 9, wherein the free space optical hinge comprises:

an adaptive optics lens directing the optical signal.

11. The optical communication hinge of claim 10, wherein the free space optical hinge further includes an encoder coupled to the mechanical hinge, the encoder sending a position signal to the adaptive optics lens.

12. The optical communication hinge of claim 11, wherein the adaptive optics lens is coupled to a controller and the controller executes an acquisition routine.

13. The optical communication hinge of claim 9, wherein the free space optical hinge further includes a reflective element having a reflective surface substantially tangential to a pivot line of the mechanical hinge.

14. The optical communication hinge of claim 13, wherein the reflective element comprises a Fresnel mirror.

15. The optical communication hinge of claim 13, wherein the reflective surface has a reflective angle that is about one half a transmitter to receiver angle.

16. The optical communication hinge of claim 9, wherein the free space optical hinge is a lens.

17. The optical communication hinge of claim 16, wherein the lens is a rod lens.

18. The optical communication hinge of claim 16, wherein the lens has a focal point proximate a pivot line of the mechanical hinge.

19. An optical hinge, comprising:
   a transmitter emitting a plurality of optical signals;
   a receiver detecting the plurality of optical signals;
   a hinge mechanically coupling the transmitter and the receiver; and
   an optical coupler, directing the plurality of optical signals to the receiver.

20. The optical hinge of claim 19, wherein the optical coupler comprises a reflective surface having a plurality of focusing elements.

21. The optical hinge of claim 19, wherein the optical coupler further includes an adaptive optics lens.

22. The optical hinge of claim 19, wherein the optical coupler comprises a lens.

23. An optical communication hinge comprising:
   a transmitter housing containing a transmitting light source emitting an optical signal modulated by a data signal and a transmitter lens focusing the optical signal;
   a hinge connected to the transmitter housing; and
   a receiver housing connected to the hinge, the receiver housing containing an elliptical mirror.

* * * * *